United States Patent
Bayang et al.

(10) Patent No.: US 7,764,456 B2
(45) Date of Patent: *Jul. 27, 2010

(54) METHOD FOR REDUCING OCCURRENCES OF TAPE STICK CONDITIONS IN MAGNETIC TAPE

(75) Inventors: Josephine F. Bayang, Tucson, AZ (US); Ernest S. Gale, Tucson, AZ (US); Eiji Ogura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/175,177

(22) Filed: Jul. 17, 2008

(65) Prior Publication Data

US 2008/0272222 A1    Nov. 6, 2008

Related U.S. Application Data

(63) Continuation of application No. 11/619,087, filed on Jan. 2, 2007, now Pat. No. 7,433,146.

(51) Int. Cl.
*G11B 15/20* (2006.01)

(52) U.S. Cl. ..................... 360/71; 360/74.1

(58) Field of Classification Search ............ None
See application file for complete search history.

(56) References Cited

U.S. PATENT DOCUMENTS

| | | | |
|---|---|---|---|
| 4,015,799 A | 4/1977 | Koski et al. | |
| 4,125,881 A | 11/1978 | Eige et al. | |
| 4,466,027 A | 8/1984 | Howell et al. | |
| 4,523,133 A | 6/1985 | Messenger | |
| 4,951,161 A | 8/1990 | Suzuki et al. | ......... 360/71 |
| 5,294,791 A | 3/1994 | Pahr | |
| 5,313,343 A | 5/1994 | Yatomi | |
| 5,327,304 A | 7/1994 | Owada et al. | |
| 5,463,506 A | 10/1995 | Mitsuyasu et al. | |
| 5,576,905 A | 11/1996 | Garcia et al. | |
| 6,493,167 B2 | 12/2002 | Kobayashi et al. | |

OTHER PUBLICATIONS

"Unsticking a Magnetic Tape from a Magnetic Head," May 1972, IBM TDB vol. 14, No. 12, p. 3674.

*Primary Examiner*—Hoa T Nguyen
*Assistant Examiner*—James L Habermehl
(74) *Attorney, Agent, or Firm*—Cantor Colburn LLP; Kurt Goudy

(57) ABSTRACT

Disclosed is a method for reducing occurrences of tape stick conditions in magnetic tape, the method including stopping functional rotation of each of two bi-directionally rotatable reels of a reel-to-reel tape drive that includes a length of magnetic tape at least partially wound around each reel, a portion of the length of tape extending between the two moveable reels and contacting a head positioned between the two reels; wherein the stopping creates a stop condition in the tape drive, actuating a fractional rotation at least one of the two bi-directionally movable reels a fraction of a reel turn in a first direction during the stop condition, causing the portion of the length of tape to at least temporarily break contact with the head via the fractional rotation, and re-starting functional rotation of each of the reels, ending the stop condition via the re-starting.

1 Claim, 1 Drawing Sheet

United States Patent US 7,764,456 B2

METHOD FOR REDUCING OCCURRENCES OF TAPE STICK CONDITIONS IN MAGNETIC TAPE

CROSS REFERENCE TO RELATED APPLICATION

This application is a Continuation application of U.S. Ser. No. 11/619,087, filed Jan. 2, 2007, the contents of which are incorporated by reference herein in their entirety.

BACKGROUND

The disclosure relates generally to a method for reducing occurrences of tape stick conditions in magnetic tape, and more particularly to a method for reducing occurrences of tape stick conditions in magnetic tape disposed in a reel-to-reel tape drive.

As linear and track densities are increased for magnetic tape in reel-to-reel tape drives, it becomes desirable to have smoother and smoother media. Tape stick conditions are a long-standing problem with tape drives, and smoother media leads to more frequent occurrences of adherence between the tape and magnetic heads of the drives, especially in humid conditions. A primary cause of head to tape sticking is the "Jo-block" effect, wherein two smooth surfaces are rubbed against each other squeezing out any lubricating air interface and causing the two smooth surfaces to stick. However, it should be noted that other mechanisms of head to tape sticking are also possible.

Once the tape sticks to the head, the drive tends to drop tension because it cannot move the tape. This leaves the drive with stuck or broken tape, which is an extremely undesirable condition to a user. Further, the sticking effect may be accentuated by thin media because of tighter head to tape conforming. Once stuck to the head, the risk to breaking the tape is very high. As such, it would be desirable to reduce occurrences of stick conditions between the tape and head of a reel-to-reel tape drive.

SUMMARY

Disclosed is a method for reducing occurrences of tape stick conditions in magnetic tape, the method including stopping functional rotation of each of two bi-directionally rotatable reels of a reel-to-reel tape drive that includes a length of magnetic tape at least partially wound around each reel, a portion of the length of tape extending between the two moveable reels and contacting a head positioned between the two reels; wherein the stopping creates a stop condition in the tape drive, actuating a fractional rotation at least one of the two bi-directionally movable reels a fraction of a reel turn in a first direction during the stop condition, causing the portion of the length of tape to at least temporarily break contact with the head via the fractional rotation, and re-starting functional rotation of each of the reels, ending the stop condition via the re-starting.

Further disclosed is a method for preventing tape stick conditions in magnetic tape, the method including stopping functional rotation of each of two bi-directionally rotatable reels of a reel-to-reel tape drive that includes a length of magnetic tape at least partially wound around each reel, a portion of the length of tape extending between the two moveable reels and contacting a head positioned in an original contact position between the two reels; wherein the stopping creates a stop condition in the tape drive, actuating a first fractional rotation of at least one of the two bi-directionally movable reels a fraction of a reel turn in a first direction after a pre-determined period of time from a start of the stop condition, causing the portion of the length of tape to at least temporarily break contact with the head via the first rotation, waiting the predetermined period of time from the first fractional rotation and actuating a second fractional rotation of at least one of the two bi-directionally movable reels the fraction of a reel turn in an opposite direction during the stop condition, causing the portion of the length of tape to at least temporarily break contact with the head via the second rotation, alternatingly repeating the first rotation and the second rotation of the reels in the first direction and the opposite direction after each successive occurrence of the period of time during the stop condition, and re-starting functional rotation of each of the reels, ending the stop condition via the re-starting.

BRIEF DESCRIPTION OF THE SEVERAL VIEWS OF THE DRAWINGS

The foregoing and other features and advantages of the present invention should be more fully understood from the following detailed description of illustrative embodiments taken in conjunction with the accompanying Figures in which like elements are numbered alike in the several Figures.

DETAILED DESCRIPTION

Figure 1:
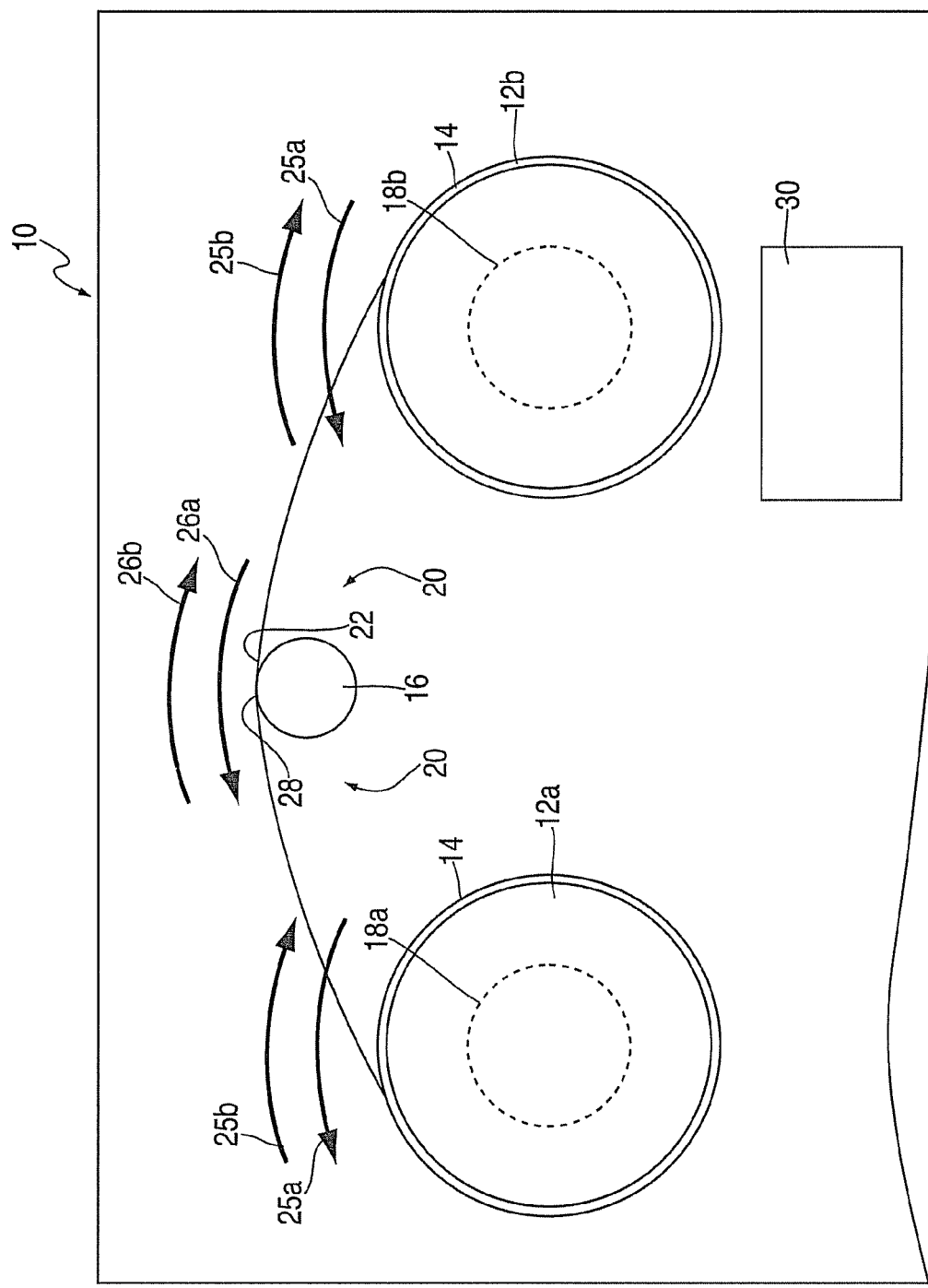
FIG. 1 is a schematic top view of a reel-to-reel tape drive.

Referring to FIG. 1, there is shown a reel-to-reel tape drive 10. The tape drive 10 includes two bi-directionally rotatable reels 12a-b, a length of magnetic tape 14, a head 16, and two motors 18a-b. The head 16 is disposed in a head region 20 between the two reels 12a-b. A portion 22 of the length of tape 14 consistently extends between the reels 12a-b across the head region 20. This portion 22 may be any portion of the length of tape 14, with the portion 22 illustrated in FIG. 1 representing a portion that extends across the region 20 while the drive 10 is experiencing a stop condition (described in greater detail later in the disclosure). The portion 22 contacts the head 16 within the head region 20. During operation of the drive 10, the head 16 reads/writes on the tape via this contact.

Typically, drives experience two general conditions; operating conditions and stop conditions. Operating conditions include functional rotation of the reels 12a-b, in which at least one of the reels 12a-b are actuated by at least one of the motors 18a-b to achieve multiple, full rotations that facilitate (among other things) tape reading/writing. Stop conditions are the periods of time when the reels 12a-b are not fully rotating in a manner that facilitates tape reading/writing, or other, normal drive functions. Stop conditions last any desired amount of time between operating conditions, and sometimes include a "stoplock mode," in which the tension is lowered while the tape 14 is stopped in place between the reels 12a-b in order to preserve the tape 14, save power, and reduce heat. Whether a "stoplock" mode occurs or not, any possibility that the portion 22 of tape 14 may stick to the head 16 increases with the duration of a stop condition.

To reduce occurrences of these tape stick conditions, at least one fractional rotation (as represented by arrows 25a-b in the FIGURE) of at least one of the reels 12a-b is employed during the stop condition. In an exemplary embodiment, the drive 10 waits a pre-determined period of time, and then employs a first fractional rotation 25a of at least one of the reels 12a-b. This fractional rotation moves the portion 22 of tape 14 (a movement represented by arrow 26a) in a manner that breaks the contact between the portion 22 of tape and the head 16, preventing stick conditions. If the stop condition lasts long enough that the pre-determined period of time passes again (i.e. after the first fractional rotation 25a), a second fractional rotation 25b of at least one of the reels 12a-b is employed. The second fractional rotation 25b is (typically) in a direction opposite the first fractional rotation 25a, and thus, causes the portion of tape to move (as represented by arrow 26b) in a direction opposite the direction of the initial movement 26a. Like the initial movement 26a, the movement 26b breaks the contact between the portion 22 of tape and the head 16, preventing stick conditions.

In an exemplary embodiment, the fractional rotations 25a-b and movements 26a-b discussed above will occur after every successive occurrence of the predetermined period of time during a respective stop condition, with the rotations/movements alternating between the first rotation 25a and second rotation 25b, and the movements 26a-b that are produced respectively therefrom. Alternating the direction of the movements 26a-b keeps the portion 22 of tape from "walking" too far from an original contact position 28 present at the start of a respective stop condition.

It should be appreciated, in an exemplary embodiment, that the fractional rotations 25a-b of the reels are about $\frac{1}{8}^{th}$ of a full rotation of each of the reels 12a-b, and the pre-determined time period is about one minute. Actuation of the fractional rotations 25a-b of the reels may be achieved via any means desired, including internal motor controls, and/or an increased current to the motor(s) 18a-b associated with the actively rotating reel(s) 12a-b. It should also be appreciated, in an exemplary embodiment, that the drive 10 may include a drive memory resource 30 that is capable of storing in memory the original contact position 28 of the portion 22 of tape, and returning the portion 22 of tape, which may have been subject to multiple movements 26a-b, to this original contact position 28.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A method for reducing occurrences of tape stick conditions in magnetic tape, the method comprising:

stopping functional rotation of each of two bi-directionally rotatable reels of a reel-to-reel tape drive that includes a length of magnetic tape at least partially wound around each reel, a portion of said length of tape extending between said two moveable reels and contacting a head positioned in an original contact position between said two reels; wherein said stopping creates a stop condition in said tape drive;

actuating a fractional rotation at least one of said two bi-directionally movable reels a fraction of a reel turn in a first direction during said stop condition;

causing said portion of said length of tape to at least temporarily break contact with said head via said fractional rotation;

re-starting functional rotation of each of said reels, ending said stop condition via said re-starting;

storing in drive memory said original contact position; and returning said portion of said length of tape to said original contact position prior to said re-starting.

* * * * *